(12) United States Patent
Schmid et al.

(10) Patent No.: US 10,651,893 B2
(45) Date of Patent: *May 12, 2020

(54) TDD REPEATER FOR A WIRELESS NETWORK AND METHOD FOR OPERATING SAID REPEATER

(71) Applicant: Andrew Wireless Systems GmbH, Buchdorf (DE)

(72) Inventors: Peter Schmid, Marsheim-Neuhausen (DE); Oliver Braz, Monheim (DE); Peter Gunzner, Monheim (DE); Mathias Schmalisch, Augsburg (DE); Joerg Stefanik, Donauworth (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,777

(22) Filed: Sep. 18, 2017

(65) Prior Publication Data
US 2018/0069596 A1 Mar. 8, 2018

Related U.S. Application Data

(63) Continuation of application No. 14/971,286, filed on Dec. 16, 2015, now Pat. No. 9,774,368, which is a
(Continued)

(30) Foreign Application Priority Data

Apr. 9, 2008 (DE) .................. 10 2008 017 881

(51) Int. Cl.
*H04B 3/36* (2006.01)
*H04B 7/155* (2006.01)
(Continued)

(52) U.S. Cl.
CPC ............. *H04B 3/36* (2013.01); *H04B 7/0413* (2013.01); *H04B 7/155* (2013.01); *H04L 5/14* (2013.01);
(Continued)

(58) Field of Classification Search
None
See application file for complete search history.

(56) References Cited

U.S. PATENT DOCUMENTS 4,794,649 A 12/1988 Fujiwara
5,371,548 A 12/1994 Williams
(Continued)

FOREIGN PATENT DOCUMENTS

CN 1487758 A 4/2004
CN 1545225 A 11/2004
(Continued)

OTHER PUBLICATIONS

China Patent Office, "First Office Action for CN Application No. 201510689943.4", "from Foreign Counterpart to U.S. Appl. No. 12/936,760", dated Nov. 17, 2017, pp. 1-22, Published in: CN.
European Patent Office, "European Communication Rule 71(3)" from Foreign Counterpart to U.S. Appl. No. 12/936,760, dated Aug. 21, 2017, pp. 1-35, Published in: EP.
(Continued)

*Primary Examiner* — Christine T Duong
(74) *Attorney, Agent, or Firm* — Fogg & Powers LLC

(57) ABSTRACT

In one embodiment, a TDD repeater system comprises: a master unit comprising separate uplink and downlink signal paths defined therein, and configured to couple in an uplink direction to a base station and in a downlink direction to at least one remote antenna unit, wherein the uplink path communicates uplink communication signals, wherein the downlink path communicates downlink communication signals; a switch configured to change direction of signal transmissions within the master unit between the uplink communication signals and the downlink communication
(Continued)

signals; a synchronizing unit is configured to receive via the downlink signal path a clock signal from the downlink communication signals, wherein the synchronizing unit supplies a control signal to the switch corresponding to the clock signal; wherein the switch swaps the direction of signal transmissions within the master unit between the uplink communication signals and the downlink communication signals in response to the control signal.

18 Claims, 1 Drawing Sheet

Related U.S. Application Data continuation of application No. 14/279,100, filed on May 15, 2014, now Pat. No. 9,219,524, which is a continuation of application No. 12/936,760, filed as application No. PCT/EP2009/001655 on Mar. 7, 2009, now Pat. No. 8,730,848.

(51) Int. Cl.
  *H04L 5/14* (2006.01)
  *H04L 7/00* (2006.01)
  *H04B 7/0413* (2017.01)

(52) U.S. Cl.
  CPC .......... *H04L 5/1415* (2013.01); *H04L 7/0012* (2013.01); *H04L 7/0033* (2013.01)

(56) References Cited

U.S. PATENT DOCUMENTS

| | | |
|---|---|---|
| 5,471,187 A | 11/1995 | Hansen et al. |
| 5,602,836 A | 2/1997 | Papadopoulos et al. |
| 5,970,055 A | 10/1999 | Park et al. |
| 6,108,364 A | 8/2000 | Weaver, Jr. et al. |
| 6,115,369 A | 9/2000 | Oura |
| 6,512,427 B2 | 1/2003 | Nakano |
| 6,577,617 B1 | 6/2003 | Ue et al. |
| 6,650,630 B1 | 11/2003 | Haartsen |
| 6,856,736 B2 | 2/2005 | Deutsch et al. |
| 6,940,827 B2 | 9/2005 | Li et al. |
| 6,985,538 B2 | 1/2006 | Murakami et al. |
| 7,233,771 B2 | 6/2007 | Proctor, Jr. et al. |
| 7,486,639 B2 | 2/2009 | Stanwood et al. |
| 7,519,323 B2 | 4/2009 | Mohebbi |
| 7,627,067 B2 | 12/2009 | Coulson |
| 7,653,163 B2 | 1/2010 | Sadri et al. |
| 7,715,871 B2 | 5/2010 | Duan |
| 7,773,887 B2 | 8/2010 | Lee et al. |
| 7,848,647 B2 | 12/2010 | Watanabe |
| 7,876,716 B2 | 1/2011 | Sudo |
| 7,894,332 B2 | 2/2011 | Chen |
| 7,899,084 B2 | 3/2011 | Cho et al. |
| 7,979,022 B2 | 7/2011 | Cho et al. |
| 8,041,222 B2 | 10/2011 | Lee et al. |
| 8,165,100 B2 | 4/2012 | Sabat et al. |
| 8,300,724 B2 | 10/2012 | Rheinfelder et al. |
| 8,374,110 B2 | 2/2013 | Kwon et al. |
| 8,730,848 B2 | 5/2014 | Schmid et al. |
| 9,130,641 B2 | 9/2015 | Mohebbi |
| 9,219,524 B2 | 12/2015 | Schmid et al. |
| 9,774,368 B2 | 9/2017 | Schmid et al. |
| 2003/0142649 A1* | 7/2003 | Taniguchi ............ H04B 7/2656 370/336 |
| 2003/0189917 A1 | 10/2003 | Sudo |
| 2004/0190840 A1 | 9/2004 | Deutsch et al. |
| 2005/0254442 A1 | 11/2005 | Proctor et al. |
| 2006/0013594 A1 | 1/2006 | Sung et al. |
| 2006/0051100 A1 | 3/2006 | Watanabe |
| 2006/0172781 A1 | 8/2006 | Mohebbi |
| 2006/0234738 A1* | 10/2006 | Costa ................... H04B 7/2696 455/502 |
| 2007/0015462 A1 | 1/2007 | Dean et al. |
| 2007/0091988 A1 | 4/2007 | Sadri et al. |
| 2007/0155314 A1 | 7/2007 | Mohebbi |
| 2007/0155315 A1 | 7/2007 | Lee et al. |
| 2007/0201402 A1 | 8/2007 | Cho et al. |
| 2007/0230432 A1 | 10/2007 | Choi et al. |
| 2007/0268846 A1* | 11/2007 | Proctor, Jr. ........ H04B 7/15535 370/279 |
| 2007/0291668 A1 | 12/2007 | Duan |
| 2008/0056167 A1 | 3/2008 | Kim et al. |
| 2008/0145061 A1 | 6/2008 | Lee et al. |
| 2009/0003467 A1 | 1/2009 | Chen |
| 2009/0180407 A1 | 7/2009 | Sabat et al. |
| 2009/0252206 A1 | 10/2009 | Rheinfelder et al. |
| 2009/0316609 A1* | 12/2009 | Singh ................... H04B 7/2609 370/280 |
| 2010/0002620 A1 | 1/2010 | Proctor, Jr. et al. |
| 2010/0041341 A1* | 2/2010 | Stratford .................. H04L 5/14 455/67.14 |
| 2010/0097964 A1 | 4/2010 | Astely et al. |
| 2010/0177668 A1* | 7/2010 | Ahn ........................ H04B 1/54 370/279 |
| 2014/0254440 A1 | 9/2014 | Schmid et al. |

FOREIGN PATENT DOCUMENTS

| | | |
|---|---|---|
| CN | 1707987 A | 12/2005 |
| CN | 1756121 A | 4/2006 |
| CN | 2904482 Y | 5/2007 |
| DE | 19738254 A1 | 3/1999 |
| EP | 0986192 A2 | 3/2000 |
| EP | 1995968 A2 | 11/2008 |
| GB | 2418803 B | 4/2006 |
| JP | 07131401 A | 5/1995 |
| KR | 20040108468 A | 12/2004 |
| KR | 100473992 B1 | 3/2005 |
| KR | 20060032934 A | 4/2006 |
| KR | 100673868 B1 | 1/2007 |
| WO | 2006107136 A1 | 10/2006 |
| WO | 2007102707 A1 | 9/2007 |
| WO | 2009124624 A1 | 10/2009 |

OTHER PUBLICATIONS

European Patent Office, "Extended EP Search Report from EP Application No. 18150663.5 dated Apr. 24, 2018", From Foreign Counterpart of U.S. Appl. No. 12/936,760; pp. 1-8; Published in EP.

China Patent Office, "First Office Action for CN Application No. 200980120599.X", dated Feb. 16, 2013, pp. 1-21, Published in: CN.

China Patent Office, "Fourth Office Action for CN Application No. 200980120599.X", "National Stage filing of PCT Application No. PCT/EP2009/001655", dated Feb. 17, 2015, pp. 1-10, Published in: CN.

China Patent Office, "Notice of Granting Patent Right for CN Application No. 200980120599.X", "National Stage filing of PCT Application No. PCT/EP2009/001655", dated Aug. 7, 2015, pp. 1-2, Published in: CN.

China Patent Office, "Second Office Action from CN Application No. 200980120599.X", "National Stage filing of PCT Application No. PCT/EP2009/001655", dated Nov. 12, 2013, pp. 1-4, Published in: U.S.

China Patent Office, "Third Office Action from CN Application No. 200980120599.X", "National Stage filing of PCT Application No. PCT/EP2009/001655", dated Jun. 3, 2014, pp. 1-13, Published in: CN.

Durach, "Leaky Feeder Cables for In-House Coverage", "Funkschau", 1997, pp. 48-49.

European Patent Office, "European Search Report for EP Application No. 13005254.1", dated Dec. 10, 2013, pp. 1-7, Published in: EP.

International Search Authority, "International Search Report and Written Opinion from PCT Application No. PCT/EP2009/001655", dated Aug. 20, 2009, pp. 1-5, Published in: U.S.

U.S. Patent Office, "Final Office Action", "from U.S. Appl. No. 12/936,760", dated Aug. 30, 2013, pp. 1-15, Published in: U.S.

(56) References Cited

OTHER PUBLICATIONS

U.S. Patent Office, "Notice of Allowance", "from U.S. Appl. No. 12/936,760", dated Dec. 31, 2013, pp. 1-15, Published in: U.S.
U.S. Patent Office, "Notice of Allowance", "from U.S. Appl. No. 14/279,100", dated Aug. 6, 2015, pp. 1-5, Published in: U.S.
U.S. Patent Office, "Office Action", "from U.S. Appl. No. 12/936,760", dated Mar. 4, 2013, pp. 1-25, Published in: U.S.
U.S. Patent Office, "Office Action", "from U.S. Appl. No. 14/279,100", dated Mar. 10, 2015, pp. 1-30, Published in: U.S.
United States Patent and Trademark Office, "Notice of Allowance and Fee(s) Due", "from U.S. Appl. No. 14/971/286", dated Jan. 13, 2017, pp. 1-9, Published in: US.
United States Patent and Trademark Office, "Notice of Allowance and Fee(s) Due", "from U.S. Appl. No. 14/971,286", dated May 25, 2017, pp. 1-10, Published in: US.
United States Patent and Trademark Office, "Supplemental Notice of Allowance", "from U.S. Appl. No. 14/971,286", dated Feb. 8, 2017, pp. 1-2, Published in: US.
State Intellectual Property Office, People's Republic of China, "Second Office Action from CN Application No. 201510689943.4 dated Jul. 23, 2018" from Foreign Counterpart of U.S. Appl. No. 12/936,760; pp. 1-24; Published in CN.
European Patent Office, "Communication pursuant to Article 94(3) from EP Application No. 18150663.5 dated May 14, 2019", from Foreign Counterpart to U.S. Appl. No. 12/936,760, pp. 1-4, Published: EP.
State Intellectual Property Office, P.R. China, "Third Office Action from CN Application No. 201510689943.4 dated Feb. 3, 2019", from Foreign Counterpart to U.S. Appl. No. 12/936,760, pp. 1-22, Published: CN.

* cited by examiner

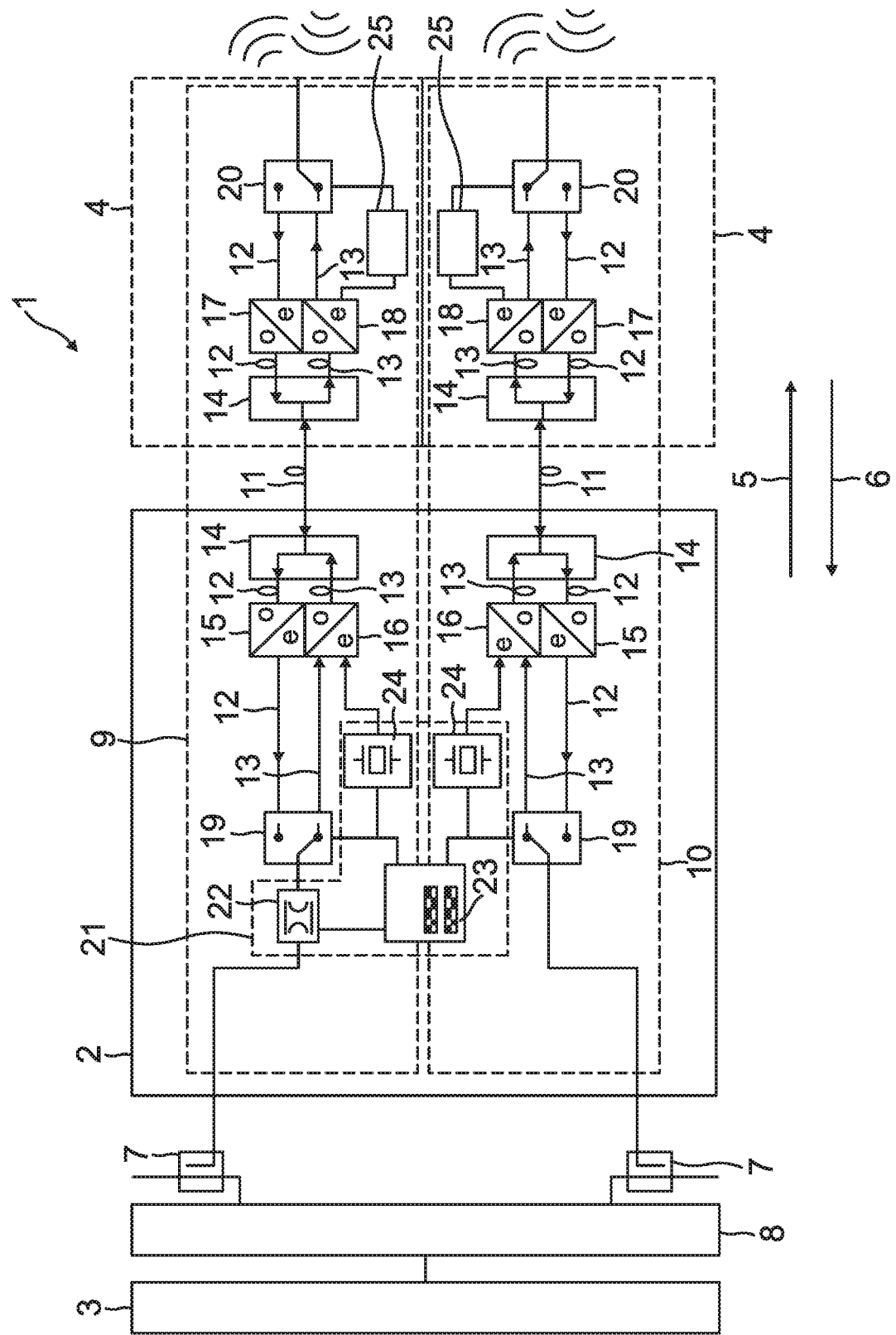

TDD REPEATER FOR A WIRELESS NETWORK AND METHOD FOR OPERATING SAID REPEATER

CROSS-REFERENCE TO RELATED APPLICATIONS

This Application is a Continuation Application of U.S. application Ser. No. 14/971,286, filed Dec. 16, 2015, entitled "TDD REPEATER FOR A WIRELESS NETWORK AND METHOD FOR OPERATING SAID REPEATER", which is a Continuation Application of U.S. application Ser. No. 14/279,100, filed May 15, 2014, now U.S. Patent Publication No. 2014/0254440, published Sep. 11, 2014, entitled "TDD REPEATER FOR A WIRELESS NETWORK AND METHOD FOR OPERATING SAID REPEATER"; which application is a Continuation Application of U.S. application Ser. No. 12/936,760, filed Feb. 25, 2011, now issued U.S. Pat. No. 8,730,848, issued May 20, 2014, entitled "TDD REPEATER FOR A WIRELESS NETWORK AND METHOD FOR OPERATING SAID REPEATER"; which application is a National filing of and claims priority to International Application No. PCT/EP2009/001655, filed Mar. 7, 2009, now International Publication Number WO2009/124624, published Oct. 15, 2009, entitled "TDD REPEATER FOR A WIRELESS NETWORK AND METHOD FOR OPERATING SAID REPEATER", which application claims priority to German Application Serial No. DE 200810017881, filed Apr. 9, 2008, entitled "TDD REPEATER FOR A WIRELESS NETWORK AND METHOD FOR OPERATING SAID REPEATER", for which all applications, patents, and Publications of each are incorporated herein by reference in their entireties.

FIELD OF THE INVENTION

One or more of the presented embodiments relate to a repeater for transmitting communication signals in a wireless network—for example a mobile radio network or a so-called "Wireless Local Area Network" (WLAN)—according to the so-called time-division duplex (TDD) method. One or more of the presented embodiments also relate to a method for operating such a repeater.

BACKGROUND

Within a wireless network, communication is usually effected between so-called base stations and data receivers and transmitters, hereinafter referred to as network terminals. In the case of a mobile radio network, these network terminals are mobile communication terminals ("cellular telephones"), in the case of a WLAN, they are typically mobile computers ("laptops") with corresponding network interface cards. During data exchange between the base station and a network terminal, radio signals are transmitted, on the one hand, in a so-called "downlink direction" from the base station to the network terminal and, on the other hand, in a so-called "uplink direction", from the network terminal to the base station. To separate the signal communications in uplink direction and downlink direction from each other, the so-called time-division duplex (TDD) method is used, among others. In the TDD method, the same transmission frequency is used both in uplink and in downlink direction. For an undisturbed signal transmission, a defined time window is allocated to each signal direction, so that transmission is effected alternately in uplink and in downlink direction with a specific clock pulsing. The clock pulsing is usually preset by the base station.

To enable signal transmission even in an area shadowed for radio waves, such as, for example, in a tunnel or inside a building, so-called repeaters are used, which from the point of view of transmission engineering are inserted between the base station and the network terminals. A repeater working according to the TDD method is known, for example, from US 2007/0015462 A1.

In one design, also called distribution system, such a repeater comprises a master unit, communicating in particular with the base station of the radio network, as well as at least one so-called "remote unit", which—arranged, for example, inside the building—established the contact with the network terminal. The signal transmission between the master unit and the remote unit is often effected in the form of an optical communication signal through an optical waveguide, for example a fiber optic cable.

The master unit forwards the signal received from the base station in the downlink direction to the remote unit. Vice versa, the remote unit forwards a signal arriving from the mobile-communication terminal in the uplink direction to the master unit. Often, the signals in uplink and in downlink direction are transmitted through a common waveguide.

To use such a repeater within the framework of a TDD signal transmission, the signal transmission through the waveguide must be adapted to the preset clock pulsing of the surrounding radio-signal transmission. In particular, the master unit and the remote unit have to be synchronized with each other in conformity with the clock pulsing.

SUMMARY

One or more embodiments are based on the task to provide a repeater which is particularly suitable for a time-division duplex transmission of communication signals. In this connection, one understands by communication signals—contrary to repeater-internal signals—those signals which are transmitted beyond the repeater between the base station and the network terminals. One or more of the presented embodiments, furthermore, are based on the task to provide a method particularly suitable for operating such a repeater.

DRAWINGS

The accompanying drawing, which is incorporated in and constitutes a part of this Specification, illustrates example embodiments and, together with a general description of example embodiments given below, serves to explain the principles of the embodiments. Parts and variables corresponding to each other are in all FIGURES always identified by the same reference numbers.

FIG. 1 is a circuit block diagram of one embodiment of the present disclosure.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Regarding the repeater, this task is solved according to an embodiment of the present disclosure, according to which the repeater comprises a master unit for communicating with a base station of a wireless network, at least one remote unit for communicating with a network terminal, and a waveguide connecting the remote unit with the master unit for transmitting the communication signals in an uplink direction from the remote unit to the master unit and in a downlink direction from the master unit to the remote unit. Both the master unit and the remote unit comprise a switch—hereinafter referred to as (time) duplexer—for changing over between the signal transmission in uplink direction and the signal transmission in downlink direction. Both duplexers are selected by a synchronizing unit arranged in the master unit, said synchronizing unit being designed for determining a clock pulsing from the communication signal fed to the master unit—in particular from the base station—and for supplying a control signal corresponding to this clock pulsing to the duplexers.

With the proposed repeater, it is possible to adapt the transmission or transmission direction of the communication signals to a clock pulsing preset by the base station in a simple and efficient manner. It is particularly advantageous in this connection that in the proposed repeater, the duplexer of the remote unit, too, is synchronized by the synchronizing unit arranged in the master unit, so that the repeater can be designed in a particularly efficient way.

The repeater is preferably designed for optical signal transmission between the master unit and the remote unit. In this case, the waveguide is an optical waveguide, in particular a fiber optic cable. Alternatively, however, an electrical signal transmission between the master unit and the remote unit can also be provided. In this case, the waveguide is designed in particular as a coaxial cable or as a hollow conductor.

In a particularly efficient embodiment of the present disclosure, the repeater is adapted for transmitting the control signal for selecting the duplexer of the remote unit to the remote unit in the form of an (optical or electrical) signal via the waveguide provided anyhow for the exchange of the communication signals. A simple separation of the control signal from the communication signal—transmitted via the same waveguide—is possible in particular through the fact that the synchronizing unit provides the control signal with a modulation frequency different from that of the communication signal.

To acquire the clock pulsing, the synchronizing unit expediently comprises a coupler, with which it picks off the communication signal. The synchronizing unit determines a clock signal overlaying the communication signal, said clock signal being formed, for example, by a so-called "pilot tone" or a synchronization sequence in a preamble of a transmission frame of the communication signal. In particular, the synchronizing unit comprises, for extracting the clock signal from the communication signal, a circuit, in particular a circuit designed as a microcontroller, to which the decoupled signal is fed.

Preferably, the control signal is generated first of all in the form of an electrical radio-frequency (RF) signal. For this purpose, the synchronizing unit comprises a frequency generator. For transmission to the remote unit, this RF control signal is preferably converted into an optical control signal and transmitted through the waveguide to the remote unit. For this purpose, the master unit expediently comprises an optical transmitter. In the remote unit, the control signal is in this case converted back, by means of an optical receiver arranged in the remote unit, into an electrical control signal and used for selecting the duplexer arranged in the remote unit.

In a further embodiment of the present disclosure, the repeater comprises at least two remote units, each of them connected by a separate waveguide with the master unit. Each of these remote units comprises a duplexer. Additionally, one duplexer for each remote unit is provided in the master unit. Efficiently, all duplexers are selected by a common synchronizing unit—also arranged in the master unit.

Additionally or alternatively, the repeater comprises at least two remote units connected by a common waveguide with the master unit. In this case, the repeater is designed for modulating the signals associated to each remote unit into different transmission wave lengths, so that these signals can be separated by means of their specific transmission wave lengths.

In a preferred embodiment of the repeater, several remote units are in particular connected to the master unit in a so-called m×n MIMO (Multiple Input Multiple Output; m,n=2, 3, . . . ) configuration. In this case, the master unit contains several separate transmission links, each of them corresponding with a remote unit. The master unit, on the other hand, is provided with two antenna connection points for signal transmission with the base station.

Concerning the method, the task is solved according to one example embodiment, using the above-described repeater, by the features of claim 8, which provides the generation of a control signal through the synchronizing unit, by means of a preset clock signal—preset in particular by the base station—and the selection, with this control signal, of both the duplexer of the master unit and the duplexer of the remote unit in such a way that the changeover of the signal transmission between uplink and downlink direction is effected synchronously—i.e. approximately simultaneously—with the preset clock pulsing.

The synchronous selection of the duplexers, however, preferably takes into account the propagation time of the communication signals between the master unit and the remote unit. The duplexers arranged in the master unit and the duplexer arranged in the remote unit are not switched exactly simultaneously, but with a slight time staggering corresponding approximately to the signal propagation time.

In the following, an exemplary embodiment is explained in detail by means of a drawing, in which the only FIGURE is a schematic representation of a repeater 1 of a wireless network for the so-called "time-division duplex" signal transmission in an area shadowed for radio waves, such as, for example, a building.

The repeater 1 comprises a master unit 2 which communicates—in this case in a wire-bound manner—with a base station 3 (represented on the left side of the FIGURE) of the wireless network. In addition, the repeater 1 comprises two remote units 4 (represented on the right side of the FIGURE), which—arranged, for example in the building—communicate with a mobile network terminal (e.g. a laptop or a cellular telephone) via schematically indicated radio waves. A radio frequency (RF) communication signal arriving from the base station 3 is forwarded in a so-called downlink direction 5 (indicated by an arrow) in the form of an optical communication signal to the remote units 4, converted back there into a radio signal and transmitted to the network terminal. Vice versa, a communication signal sent by the network terminal is forwarded in a so-called uplink direction 6 (also indicated by an arrow) in the form of an optical communication signal to the master unit 2 and transmitted from there to the base station 3.

The repeater 1 is in this case designed in a so-called "2×2 Multiple Input Multiple Output" (MIMO) configuration. Accordingly, the base station 3 possesses two antenna connection points 7 connected through an antenna or distributing bus bar 8 with the base station 3. On the other hand, signal transmission to the two remote units 4 is effected through two separate channels, namely a first transmission link 9 (indicated schematically) and a second transmission link 10 (also indicated schematically). Each transmission link 9,10 comprises for optical signal transmission a separate optical waveguide, which in the present case is designed as a fiber optic cable 11 and through which each remote unit 4 is connected with the master unit 2. Alternatively, a separate signal transmission, from the point of view of signalling technology, due to a frequency transformation, by means of a common waveguide (frequency duplex), is also possible.

The repeater 1 is designed for signal transmission according to the so-called time-division duplex method, by which the (optical) communication signals are transmitted alternately in time in downlink direction 5 or uplink direction 6, respectively, according to a clock pulsing preset by the base station 3. For this purpose, each transmission link 9, 10 is split both inside the master unit 2 and inside the remote unit 4 into a—partly optical, partly electrical—uplink 12 and a downlink 13, the optical part of the link being coupled in each case via a Y-connection 14 with the fiber optic cable 11. The electrical part is connected at least indirectly with the base station 3 or with the mobile data receiver/transmitter. Within each link, the communication signal is converted from an optical signal into an electrical signal or vice versa. For this purpose, the master unit 2 comprises within each uplink 12 an optical receiver 15 and within each downlink 13 an optical transmitter 16, whereas each remote unit 4 comprises within the uplink 12 an optical transmitter 17 and within the downlink 13 an optical receiver 18.

For changing over the transmission direction, the master unit 2 comprises for each transmission link 9, 10 a (time) duplexer 19, with which the change-over in the electrical part between the uplink 12 and the downlink 13 is effected. Thus, depending on the position of the duplexer 19, either the uplink 12 or the downlink 13 is connected with the base station 3. On the other hand, each remote unit 4 also comprises within the electrical part of the transmission link 9, 10 a (time) duplexer 20, with which either the uplink 12 or the downlink 13, depending on the switch position, is connected with the mobile data receiver/transmitter for communication. The switch position shown here corresponds, for example, to a transmission in downlink direction 6.

To synchronize the clock pulsing of the optical transmission with the clock pulsing of the base station 3, the master unit 2 comprises a synchronizing unit 21 which picks off a clock signal sent by the base station 3 and selects the duplexer 19, on the one hand, and each duplexer 20, on the other hand, accordingly.

For this purpose, the synchronizing unit 21 possesses a coupler 22, with which the communication signal fed from the base station 3 to the master unit 2 is decoupled. In the shown embodiment, the coupler 22 accesses the first transmission link 9.

A clock signal, for example in the form of a so-called pilot tone, overlays this communication signal. Alternatively, the clock signal is connected ahead in the form of a so-called preamble of a signal transmission frame. This clock signal is identified by the synchronizing unit 21.

For this purpose, the synchronizing unit 21 comprises an integrated circuit, in particular a microcontroller, here referred to as "switching-point detector" 23, connected, from the point of view of signal technology, with the coupler 22. By means of the decoupled signal, the switching-point detector 23 decides whether the base station 3 is transmitting (transmission in downlink direction 5) or receiving (transmission in uplink direction 6). Accordingly, the switching-point detector 23 directly selects both duplexers 19 of the master unit 2.

In order to synchronize, in addition, the duplexers 20 of the remote units 4, an optical control signal is transmitted to them, by means of the decoupled clock signal, via each fiber optic cable 11. For this purpose, the synchronizing unit 21 possesses for each transmission link 9, 10 one frequency generator 24. Each frequency generator 24 is also coupled with the switching-point detector 23, from the point of view of signalling technology, and generates, due to the latter's information, an RF control signal for selecting the corresponding duplexer 20. The RF control signal is in each case converted by the optical transmitter 16 of the master unit 2 into an optical control signal and transmitted, together with the optical communication signal, via the fiber optic cable 11 to the remote unit 4, the control signal and the communication signal being sent with different modulation frequencies in order to separate them. Inside the remote unit 4, the optical receiver 18 converts the optical control signal back into an electrical control signal. This control signal, in turn, serves as a signal generator for a control unit 25, which finally supplies the duplexer 20 with clock pulses.

Therefore, both duplexers 19, 20 of each transmission link 9, 10 are synchronously supplied with clock pulses, whereby the transmission direction of the communication signals on the optical transmission section is adapted to the transmission direction of the surrounding radio transmission. Thus, in send mode of the base station 3, both duplexers 19, 20 are switched for a transmission in downlink direction 5, whereas in receive mode of the base station 3, the duplexers 19, 20 are switched for a transmission in uplink direction 6.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

LIST OF REFERENCE NUMBERS

1 Repeater
2 Master unit
3 Base station
4 Remote unit
5 Downlink direction
6 Uplink direction
7 Antenna connection point
8 Distributing bus bar
9 Transmission link
10 Transmission link
11 Fiber optic cable
12 Uplink
13 Downlink
14 Y-connection
15 Receiver 16 Transmitter
17 Transmitter
18 Receiver
19 (Time) duplexer
20 (Time) duplexer
21 Synchronizing unit
22 Coupler
23 Switching-point detector
24 Frequency generator
25 Control unit

What is claimed is:

1. A time-division duplex (TDD) repeater system, the system comprising:
   a master unit comprising an uplink signal path and a separate downlink signal path defined therein, the master unit configured to couple in an uplink direction to a base station, the master unit configured to couple in a downlink direction to at least one remote antenna unit, wherein the uplink signal path communicates uplink communication signals in the upstream direction received from the at least one remote antenna unit to the base station, wherein the downlink signal path communicates downlink communication signals in the downstream direction received from the base station to the at least one remote antenna unit;
   at least one switch configured to change direction of signal transmissions within the master unit between the uplink communication signals transmitted through the uplink signal path and the downlink communication signals transmitted through downlink signal path;
   a synchronizing unit within the master unit is configured to receive via the downlink signal path a clock signal from the downlink communication signals received in the downstream direction from the base station, wherein the synchronizing unit supplies a control signal to the at least one switch corresponding to the clock signal;
   wherein the switch swaps the direction of signal transmissions within the master unit between the uplink communication signals and the downlink communication signals in response to the control signal.

2. The system of claim 1, wherein the at least one switch comprises a switch located in the master unit.

3. The system of claim 1, wherein the at least one remote antenna unit comprises a first remote unit having a defined uplink path and a separate defined downlink path, the at least one switch comprising a switch located in the first remote unit and coupled to each of the defined paths for changing direction between the signal transmission in the uplink direction and the signal transmission in the downlink direction.

4. The system of claim 1, wherein the at least one switch comprises a first switch located in the master unit and a second switch located in the first remote unit.

5. The system of claim 4, wherein the control signal is communicated to the second switch via the downlink communication signals communicated in the downstream direction from the master unit to the at least one remote antenna unit.

6. The system of claim 1, wherein the synchronizing unit comprises:
   a coupler configured to obtain a clock signal sent by the base station to the master unit in the downlink direction, and
   a controller coupled to the coupler, wherein the controller determines whether the base station is in an send mode or a receive mode based on the clock signal; and
   wherein the controller generates the control signal.

7. The system of claim 1, wherein the master unit is coupled to the at least one remote antenna unit by at least one optical waveguide.

8. The system of claim 1, wherein the clock signal is positioned in a signal transmission frame preamble within the downlink communication signals.

9. The system of claim 1, wherein the clock signal comprises a pilot tone overlaying the downlink communication signals.

10. A radio frequency communication system, the system comprising:
    a base station;
    a master unit configured to communicate radio frequency (RF) communication signals with the base station, wherein the master unit transmits uplink RF communication signals to the base station in an uplink direction and receives downlink RF communication signals from the base station in a downlink direction, wherein the master unit comprises an uplink signal path and a separate downlink signal path defined therein,
    at least a first remote unit and a second remote unit both communicatively coupled to the master unit;
    at least one switch configured to change direction of signal transmissions within the master unit between the uplink communication signals transmitted through the uplink signal path and the downlink communication signals transmitted through downlink signal path;
    a synchronizing unit within the master unit is configured to receive via the downlink signal path a clock signal from the downlink communication signals received in the downstream direction from the base station, wherein the synchronizing unit supplies a control signal to the switch corresponding to the clock signal;
    wherein the switch swaps the direction of signal transmissions within the master unit between the uplink RF communication signals and the downlink RF communication signals in response to the control signal.

11. The system of claim 10, wherein the synchronizing unit comprises:
    a coupler configured to obtain a clock signal sent by the base station to the master unit in the downlink direction, and
    a controller coupled to the coupler, wherein the controller determines whether the base station is in an send mode or a receive mode based on the clock signal; and
    wherein the controller generates the control signal.

12. The system of claim 10, wherein the base station further comprises a distributing bus bar; and
    wherein the master unit comprising at least one antenna connection point connected to the distributing bus bar.

13. The system of claim 10, wherein the at least one switch is located within the master unit.

14. The system of claim 10, wherein the at least one remote antenna unit comprises a first remote unit having a defined uplink path and a separate defined downlink path, the at least one switch comprising a switch located in the first remote unit and coupled to each of the defined paths for changing direction between the signal transmission in the uplink direction and the signal transmission in the downlink direction.

15. The system of claim 10, wherein the at least one switch comprises a first switch located in the master unit and a second switch located in the first remote unit.

16. The system of claim 10, wherein the master unit is coupled to the at least one remote antenna unit by at least one optical waveguide.

17. The system of claim 10, wherein the clock signal is positioned in a signal transmission frame preamble within the downlink communication signals.

18. The system of claim 10, wherein the clock signal comprises a pilot tone overlaying the downlink communication signals.

* * * * *